Oct. 23, 1923.
R. E. WILSON
EVAPORATING PROCESS AND APPARATUS
Filed July 18, 1922
1,471,765
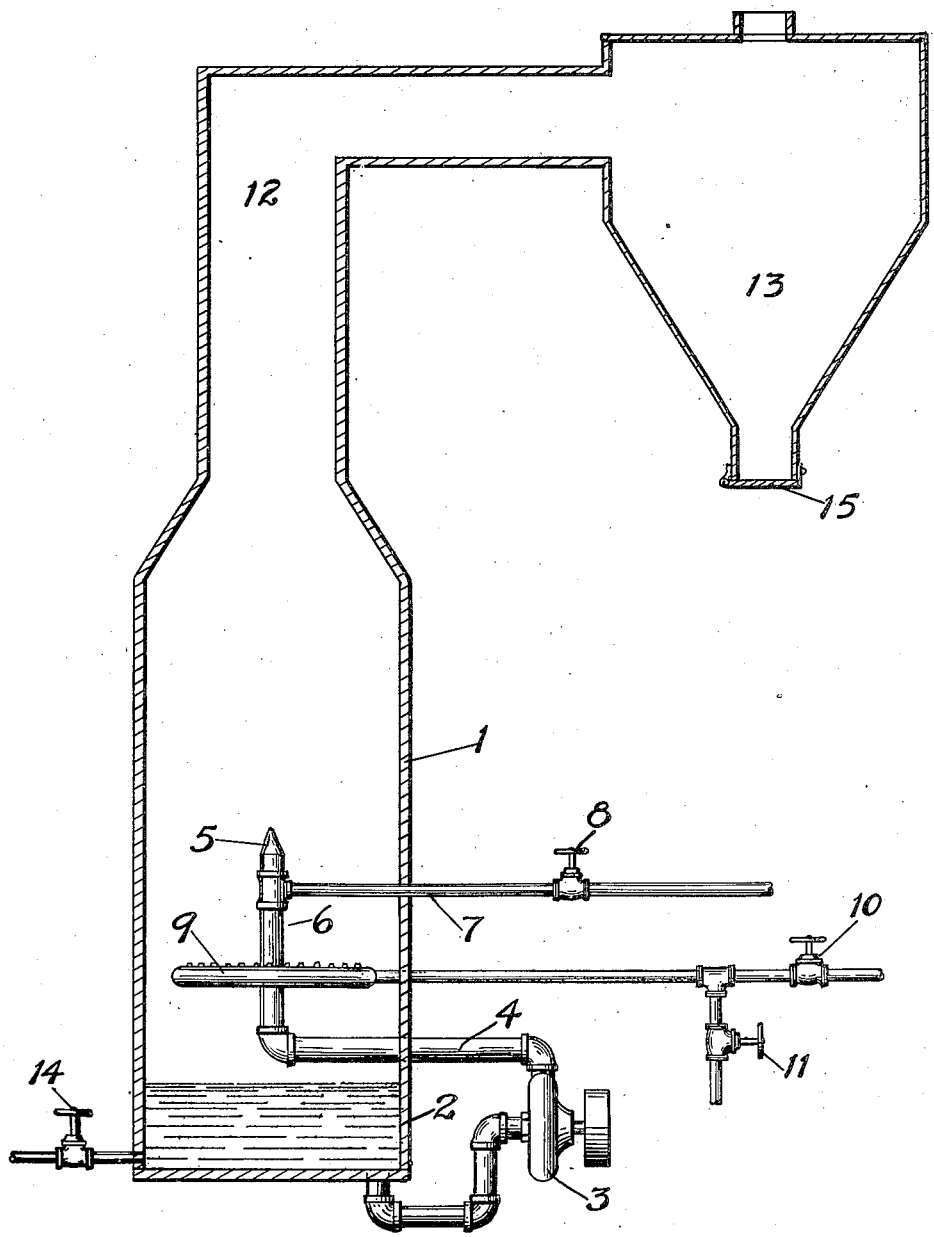

Patented Oct. 23, 1923.

1,471,765

UNITED STATES PATENT OFFICE.

ROBERT E. WILSON, OF CAMBRIDGE, MASSACHUSETTS.

EVAPORATING PROCESS AND APPARATUS.

Application filed July 19, 1922. Serial No. 575,955.

*To all whom it may concern:*

Be it known that I, ROBERT E. WILSON, a citizen of the United States, residing at Cambridge, in the county of Middlesex and State of Massachusetts, have invented certain new and useful Improvements in Evaporating Processes and Apparatus, of which the following is a specification.

This invention relates to improvements in a method and apparatus for recovering substantially non-volatile materials, particularly solids, from dispersions in liquids, such as solutions, suspensions, emulsions or combinations of these.

Among the objects of this invention is to provide a method and means for effecting a separation of a solid from its dispersion in a liquid, by a convenient, cheap and highly efficient manner.

More specifically it is an object of this invention to provide a process and apparatus for recovering, in finely divided form, solids, such as acids, salts and bases from solutions, suspensions, or emulsions, or other solid or substantially non-volatile material dispersed in a liquid; for example, the evaporation of milk to obtain dry, powdered milk.

This invention lends itself particularly well to the production of finely divided, readily soluble, solid arsenic acid from the moderately strong solution made by oxidizing $As_2O_3$ with $HNO_3$. Ordinary evaporation processes are very difficult to carry out on account of the high temperatures required, the corrosion of metal vessels through which heat is being forced, and the highly viscous or pasty character of the solution just before it solidifies, etc. Furthermore, ordinary processes yield large lumps of glassy solid material which are difficult to pack and ship to prevent their absorbing moisture, and which go into solution very slowly.

Reference is to be had to the accompanying drawing which illustrates, in diagrammatic form, an apparatus which is suitable for practicing this invention. This apparatus comprises an elongated tower (1), the lower portion (2) of which is adapted to hold the liquid to be evaporated. A circulating pump (3) communicates at one end with the lower portion (2) of the tower and at the other end is connected by the conduit or pipe (4) to a suitable sprayer (5) which projects upwardly within the tower (1). The spray pipe (6) is connected to an air line (7), provided with a suitable valve (8), for regulating the supply of air to the sprayer.

A burner (9) is positioned within the tower (1) a small distance below the sprayer (5) and is connected to a suitable source of gaseous or liquid fuel and air, the supplies of which are regulated by the valves, (10) and (11) respectively. This type of burner is used where evaporation is to be carried out by means of a burning flame. However, if lower temperatures are used, for example, in the evaporation of milk, the burner may be replaced by a suitable hot air distributor connected to a supply of heated air.

In carrying out the evaporation, the liquid from the bottom (2) of the tower is projected upwardly through the sprayer (5) by means of the circulating pump (3). The burner is then lighted, and the flames project upwardly and through the path of the drops of liquid issuing from the sprayer. The finer drops of liquid are readily carried along by the rising stream of heated air and evaporated before they pass out at the top (12) of the tower. The larger drops, however, either strike the sides of the tower or fall to the bottom (2), where they are caught in the well of liquid which is recirculated by the pump (3). For the most efficient operation of this process, the amount of spray should be so regulated that that which runs down the sides of the tower will not solidify, but will keep the base of the tower covered with a flowing film of liquid, thus preventing undesirable decomposition and at the same time utilizing most efficiently the heat in the system, especially that radiated by the burner. The finer drops which are carried along with the hot gases are quickly evaporated, and the solid particles resulting therefrom are very light and are carried along even more rapidly by the upwardly moving hot gases. These solid particles may be separated from the gases by a suitable means, such as a dust collector (13).

Another characteristic feature of this invention relates to the combustion within the chamber (1). In the evaporation of certain liquids carrying solids, the fuel may be supplied to the burner (9) with an insufficient supply of air for complete combustion thereof. As this partly burned fuel mixes with the liquid issuing from the sprayer (5), the air from the air line (7), which has become admixed with the liquid before it has issued from the sprayer, will provide the necessary oxygen for the complete combustion of the fuel. This latter burning will therefore take place among the particles of liquid, thus greatly increasing the rate of evaporation and enhancing the efficiency of the process.

The process and apparatus possess many advantages over other heating methods and devices. In the constructions where the liquid is sprayed down through a tower, the larger drops, which require the most time to evaporate, fall most rapidly, thereby resulting in little effective evaporation. In practicing this invention, however, the large drops fall back into the liquid reservoir and are then recirculated, while the small drops which can readily be evaporated are carried along.

A further advantage of this apparatus and process is that it is possible to start with very dilute solutions and carry out both concentration and evaporation to dryness in the same chamber with a high degree of efficiency, and the process does not require intermediate attention for observing the necessity of a change from one system or vessel to another. This process should preferably be operated continuously, feeding in enough dilute solution to replace the volatile liquid which is being evaporated. Also, this invention promotes more efficient use of the heat because the flame radiates to the walls which are covered with liquid.

In my method for preparing finely divided solid arsenic acid from an aqueous solution thereof, the solution is introduced at the bottom (2) of the tower through a suitable pipe and valve (14) and the circulation and evaporation conducted as herein described. The most satisfactory results are obtained if the gases in the upper portion of the tower are from 225°–300° C., but a reasonable amount of overheating up to 350° C. does not prevent ready solubility of the powdered product. The fine, solid particles will separate out in the dust collector (13) and will be discharged through the valve or door (15). The dust collector should be kept fairly hot to prevent the reabsorption of any moisture from the gas on cooling, and the parts of the tower around the spray should be constructed of materials not readily attacked by the hot acid. This latter can readily be accomplished since the heat does not have to be forced in through the walls as in ordinary methods of evaporation.

The present invention is not limited to the specific details set forth in the foregoing examples, which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In the process of desiccating liquids carrying solids, spraying said liquid upwardly in an internally heated chamber, evaporating to dryness the fine drops issuing from the spray and carrying the evaporated fine solid particles away by the ascending hot gases and allowing the large drops of the sprayed liquid to return to the main body of said liquid.

2. In a process of desiccating liquids carrying solids, spraying said liquid upwardly into the path of an ascending heating fluid, evaporating to dryness the fine drops issuing from the spray and carrying the evaporated fine solid particles away by the ascending hot gases and allowing the large drops of the sprayed liquid to return to the main body of said liquid.

3. In a process of desiccating liquids carrying solids, spraying said liquid upwardly into the path of an ascending flame, evaporating to dryness the fine drops issuing from the spray and carrying the evaporated fine solid particles away by the ascending hot gases and allowing the large drops of the sprayed liquid to return to the main body of said liquid.

4. In a process of desiccating liquids carrying solids, spraying said liquid upwardly into the path of an ascending flame and continuing the combustion of the heat producing medium during contact of the flames with the spray of liquid.

5. In a process of desiccating liquids carrying solids, spraying said liquid upwardly into the path of an ascending flame, continuing the combustion of the heat producing medium during contact of the flame with the spray of liquid, evaporating to dryness the fine drops issuing from the spray and carrying the evaporated solid particles away by the ascending hot gases and allowing the large drops of the sprayed liquid to return to the main body of said liquid.

6. In a process of desiccating liquids carrying solids, projecting a fuel burning with an insufficient supply of air into a spray of the liquid admixed with sufficient air to complete the combustion of the fuel.

7. In a process of desiccating liquids carrying solids, projecting a fuel burning with an insufficient supply of air into a spray of the liquid, admixed with sufficient air to complete the combustion of the fuel, evaporating to dryness the fine drops issuing from the spray and carrying the evaporated fine solid particles away by the ascending hot gases and allowing the large drops of the sprayed liquid to return to the main body of said liquid.

8. In a process of desiccating liquids carrying solids, spraying said liquid admixed with air upwardly into the path of an ascending, partially-burned, heating fluid, evaporating to dryness the fine drops issuing from the spray and carrying the evaporated fine solids away by the ascending hot gases and allowing the large drops of the sprayed liquid to return to the main body of said liquid.

9. In a process of desiccating liquids carrying solids, spraying said liquid upwardly into the path of an ascending heating fluid, allowing the large drops of the sprayed liquid to return to the main body of said liquid, evaporating to dryness the fine drops issuing from the spray, carrying the evaporated fine solid particles away by the ascending hot gases and then separating said solid particles from the gases.

10. In a process of desiccating liquids carrying solids, spraying said liquid upwardly into the path of an ascending flame, continuing the combustion of the heat producing medium during contact of the flame with the spray of liquid, allowing the large drops of sprayed liquid to return to the main body of said liquid, evaporating to dryness the fine drops issuing from the spray, carrying the evaporated solid particles away by the ascending hot gases and then separating said solid particles from the gases.

11. In a process of making finely-divided, soluble, arsenic acid, spraying an aqueous dispersion thereof upwardly in an internally heated chamber, evaporating the fine drops issuing from the spray and carrying the evaporated, fine, solid particles away by the ascending hot gases and allowing the large drops of the sprayed liquid to return to the main body of said liquid.

12. In a process of making finely-divided, soluble, arsenic acid, spraying an aqueous dispersion thereof upwardly into the path of an ascending flame and continuing the combustion of the heat-producing medium during contact of the flame with the spray of liquid and evaporating the fine drops issuing from said spray.

13. In a process of making finely-divided, soluble, arsenic acid, projecting a fuel burning with an insufficient supply of air into a spray of an aqueous dispersion of arsenic acid admixed with sufficient air to complete the combustion of the fuel and evaporating the fine drops issuing from said spray.

14. In a process of making finely-divided, soluble, arsenic acid, spraying an aqueous dispersion thereof upwardly into the path of an ascending flame, continuing the combustion of the heat-producing medium during contact of the flame with the spray of liquid, allowing the large drops of sprayed liquid to return to the main body of said liquid, evaporating to dryness the fine drops issuing from the spray, carrying the evaporated, solid particles away by the ascending hot gases and then separating said solid particles from the gases.

15. An apparatus for recovering solids dispersed in liquids comprising a heating chamber, a sprayer within said chamber, a liquid circulator communicating with said sprayer and the lower part of said chamber and a heater within said chamber in close proximity to and below said sprayer.

16. An apparatus for recovering solids dispersed in liquids comprising a heating chamber, a sprayer within said chamber, a liquid circulator communicating with said sprayer and the lower part of said chamber and a burner within said chamber in close proximity to and below said sprayer.

17. An apparatus for recovering solids dispersed in liquids comprising a heating chamber, a sprayer within said chamber, a liquid circulator communicating with said sprayer and the lower part of said chamber, a burner within said chamber in close proximity to and below said sprayer and means for delivering air to said sprayer.

18. An apparatus for recovering solids dispersed in liquids comprising a heating chamber, a sprayer within said chamber, a liquid circulator communicating with said sprayer and the lower part of said chamber, a burner within said chamber in close proximity to and below said sprayer, means for delivering air to said sprayer and means for regulating the supply of air to said burner.

19. An apparatus for recovering solids dispersed in liquids comprising a heating chamber, a sprayer within said chamber, a liquid circulator communicating with said sprayer and the lower part of said chamber, a burner within said chamber in close proximity to and below said sprayer, and means for separating the fine, evaporated, solid particles from the other material associated therewith.

20. An apparatus for recovering solids dispersed in liquids comprising a heating chamber, a sprayer within said chamber, a liquid circulator communicating with said sprayer and the lower part of said chamber, a heater within said chamber in close proximity to said sprayer and means for separating the fine, evaporated, solid particles from the other material associated therewith.

21. An apparatus for recovering solids dispersed in liquids comprising a heating chamber, a sprayer within said chamber, a liquid circulator communicating with said sprayer and the lower part of said chamber, a burner within said chamber in close proximity to said sprayer, means for delivering air to said sprayer and means for separating the fine, evaporated, solid particles from the other material associated therewith.

22. An apparatus for recovering solids dispersed in liquids comprising a heating chamber, a sprayer within said chamber, a liquid circulator communicating with said sprayer and the lower part of said chamber, a burner within said chamber below said sprayer, means for delivering air to said sprayer, means for regulating the supply of air to said burner and means for separating the fine, evaporated, solid particles from the other material associated therewith.

ROBERT E. WILSON.